United States Patent [19]
Toombs

[11] Patent Number: 4,499,969
[45] Date of Patent: Feb. 19, 1985

[54] LUBRICATING OIL SALVAGING BLOCK ASSEMBLY

[76] Inventor: Chauncey E. Toombs, 8010 Lake Shore Rd., Angola, N.Y. 14006

[21] Appl. No.: 488,075

[22] Filed: Apr. 25, 1983

[51] Int. Cl.³ .......................... B23B 45/00; F16C 1/26
[52] U.S. Cl. .............................. 184/106; 29/DIG. 54;
29/DIG. 101; 83/169; 137/312; 184/6.14;
184/5; 408/56; 408/241 G; 409/134; 409/135
[58] Field of Search ................. 184/106, 6.14, 5;
409/134, 135; 408/56, 710, 241 G; 83/DIG. 1,
83/169, 859; 29/DIG. 54, DIG. 77, DIG. 101;
222/109; 137/312, 313

[56] References Cited

U.S. PATENT DOCUMENTS

| | | | |
|---|---|---|---|
| 284,752 | 9/1883 | Mixer | 184/106 |
| 984,850 | 2/1911 | Rathbun | 184/106 |
| 2,770,172 | 11/1956 | Graves | 29/DIG. 1 |
| 3,881,838 | 5/1975 | Derbyshire | 408/241 G X |
| 3,897,118 | 7/1975 | Wolfthal | 184/5 X |

OTHER PUBLICATIONS

Hitachi Seiki Co., Ltd.–Catalog No. 55703W, Mazak V-75 machine.

*Primary Examiner*—David H. Brown
*Attorney, Agent, or Firm*—Bean, Kauffman & Bean

[57] ABSTRACT

A block assembly is adapted to be removably fixed to a vertically disposed way of a machine having systems for automatically supplying lubricating oil to the way and for supplying a dissimilar liquid coolant to a workpiece; the block assembly serving to collect lubricating oil flowing downwardly along the machine way and prevent its contaminating the coolant. The block assembly comprises a multi-sectional block shaped to provide an oil collection reservoir adapted to be placed in flow communication with a separate oil collection tank or sump.

6 Claims, 4 Drawing Figures

LUBRICATING OIL SALVAGING BLOCK ASSEMBLY

BACKGROUND OF THE INVENTION

In certain machines, such as vertical, numerical control machines, wherein a head mounting a main tool drive spindle is supported by a pair of machine ways for vertically directed reciprocating movements relative to a workpiece suoporting table, it is common practice to provide an essentially continuous supply of oil to the machine ways for lubrication purposes and of dissimilar coolant fluid to the workpiece in order to remove heat generated during a machining operation. A problem heretofore encountered with machines of this general tyoe is that lubricating oil flowing downwardly along the machine ways continuously drips into the coolant collection reservoir and contaminates the coolant. As the degree of contamination increases, a point is reached after which the coolant can no longer be satisfactorily used in connection with the machining operation and thus it must be drained from the machine and replaced with fresh or new coolant. Aside from environmental considerations connected with the disposal of contaminated coolant, the required periodic replacement of coolant greatly increases the cost of machine operation, due both to the relatively high cost of coolant material and the operator/machine time lost during the coolant draining/replacement operation.

An additional problem resulting from lubricating oil contamination of coolant is that an oil film is built up on surfaces of the machine contacted by the contaminant coolant with the result that chips and other debris created during a machining operation tend to stick or adhere to such oil film and greatly increase the degree of difficulty and time involved in cleaning such debris from the machine.

Devices in the form of shields have been employed to prevent splashing of coolant onto the machine ways in order to prevent its interference with the proper lubrication thereof, but such devices are ineffective in preventing lubricating oil contamination of the coolant.

SUMMARY OF THE INVENTION

The present invention is directed towards means adapted to prevent contamination of coolant employed during operation of a numerical control machine or the like by lubricating oil flowing downwardly along the machine ways forming a part of such machine. More specifically, the invention contemplates fitting each machine way with a block assembly cooperating with guide surfaces of such machine way to define a reservoir for collecting lubricating oil flowing downwardly therealong and to permit transfer of collected oil to a separate collection tank. The construction of the block assembly is such as to also minimize contamination of the lubricating oil by the coolant, otherwise resulting from the splashing of the latter onto the machine ways during operation of the machine.

DRAWINGS

The nature and mode of operation of the present invention will now be more fully described in the following detailed description taken with the accompanying drawings wherein:

FIG. 1 is a perspective view showing lubricating oil salvaging block assemblies of the present invention fixed one to each of a pair of machine ways forming a part of a numerical control machine or the like;

DETAILED DESCRIPTION

Figure 1:
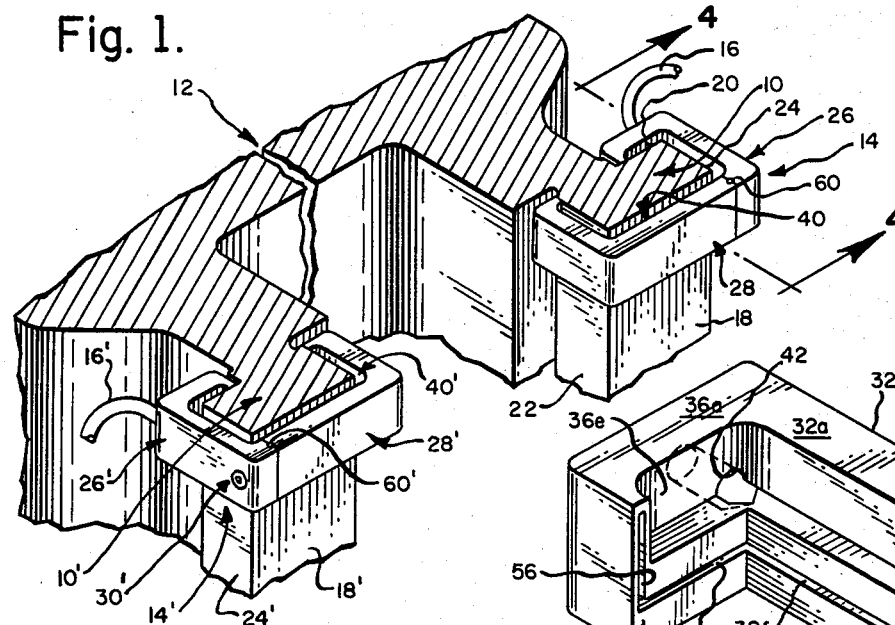

To facilitate understanding of the present invention, reference is first made to FIG. 1, wherein is illustrated a pair of vertically extending machine ways 10 and 10' of the type provided in diverse types of workpiece shaping machines 12 for the purpose of supporting a tool drive or mounting head, not shown, for vertically directed reciprocating movements relative to a workpiece supporting table or the like, also not shown. In a typical numerical control machine installation of this general type, supply means, not shown, is provided to supply lubricating oil to the upper ends of the machine ways 10 and 10'; and further means, also not shown, is provided to direct one or more streams of a dissimilar coolant fluid against the workpiece during the machining operation in order to maintain workpiece/tool temperatures at desired levels. Coolant fluid is normally collected in a reservoir arranged relatively beneath the workpiece supporting table for purposes of reuse until such time as it becomes contaminated to an unacceptable degree by pollutants, including lubricating oil flowing downwardly along the machine ways and dripping from their lower ends into the collant collecting reservoir.

In accordance with the present invention, lubricating oil còntamination of coolant fluid is avoided by removably fitting machine ways 10 and 10' with a pair of oil salvaging block assemblies 14 and 14', which serve to collect or capture lubricating oil adjacent the lower ends of the machine ways at a point beneath the normal range of travel of the tool mounting head of the machine; the block assemblies having suitable means, such as flexible tubes 16 and 16', providing for flow of collected oil to a remote point, such as a collection tank or sump, not shown, from which it may be removed for reuse or discarded.

In FIG. 1, machine ways 10 and 10' are shown as being of typical mirror image construction, and thus only machine way 10 will be specifically described as having front, rear, inner side and outer side guide or bearing surfaces 18, 20, 22 and 24, respectively; the corresponding guide or bearing surfaces of machine way 10' being designated by like primed numerals. In like fashion, block assemblies 14 and 14' are of mirror image construction, thereby permitting only block assembly 14 to be specifically described in detail with prime numerals being employed to designate like parts of block assembly 14'.

Figure 2:
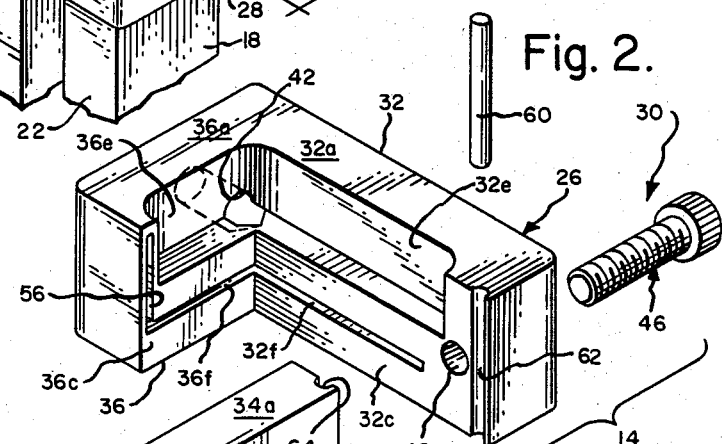
FIG. 2 is an enlarged, exploded perspective view of the right hand block assembly shown in FIG. 1.
Figure 3:
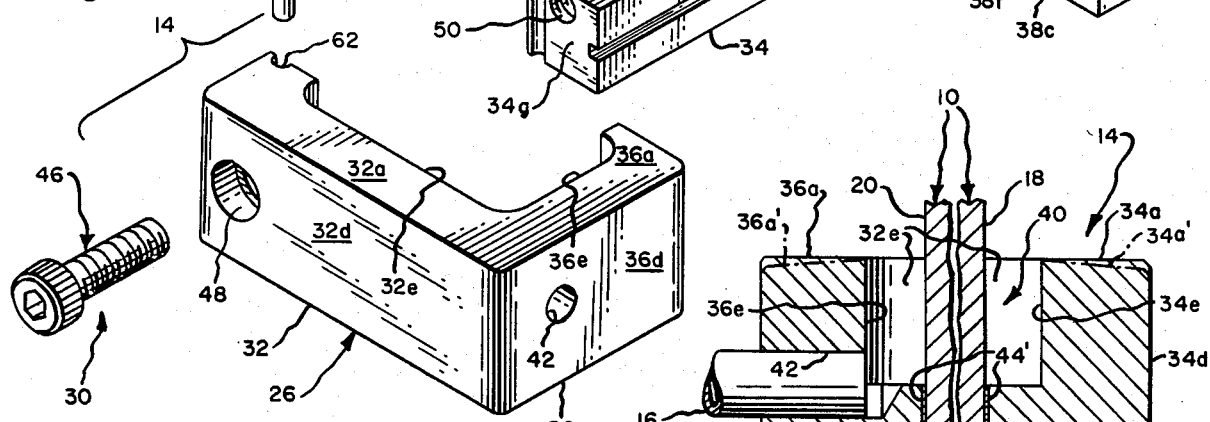
FIG. 3 is a view similar to FIG. 2, but with the block assembly displaced through 180°.

Reference is now made more particularly to FIGS. 1, 2 and 3 wherein block assembly 14 is shown as preferably including a pair of or first and second block sections 26 and 28, and coupling means 30 for coupling the block sections one to another and contiguous to guide surfaces 18, 20, 22 and 24. Sections 26 and 28 have a generally L-shaped plan view configuration defined by first or relatively long leg portions 32 and 34, respectively, and integrally formed second or relatively short leg portions 36 and 38, respectively. The leg portions have generally rectangular cross-sectional configurations defined by upper and lower surfaces designated by like numerals having "a" and "b" suffixes, respectively, and oppositely facing inner and outer surfaces designated by like numerals having "c" and "d" suffixes, respectively. Thus, when block sections 26 and 28 are joined together and clamped to machine way 10 by coupling means 30, inner surfaces 32c and 38c are disposed essentially parallel to each other and contiguous to guide surfaces 24 and 22, respectively, whereas inner surfaces 34c and 36c are disposed essentially parallel to each other and contiguous to guide surfaces 18 and 20, respectively.

Figure 4:
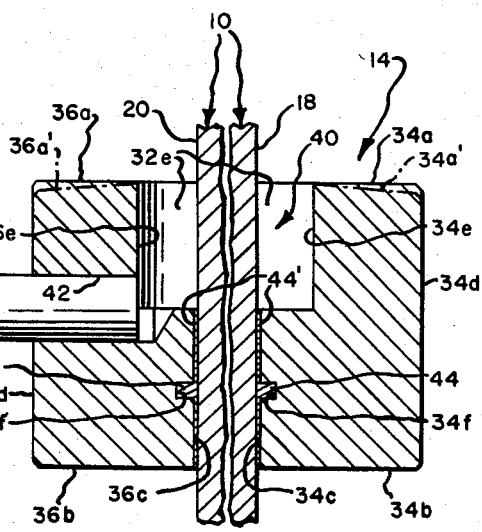
FIG. 4 is an enlarged sectional view taken generally along the line 4—4 in FIG. 1.

In accordance with the present invention, inner surfaces 32c, 34c, 36c and 38c are provided with first recesses designated by like numerals having the suffix "e", which open upwardly through upper surfaces 32a, 34a, 36a and 38a; and second recesses designated by like numerals having the suffix "f". When sections 26 and 28 are mounted on machine way 10, as an incident to the coupling or joining the sections together, as viewed in FIG. 1, their inner surfaces are disposed essentially in surface to surface or clamping engagement with the guide surfaces of machine way 10 and the ends of first recesses 32e and 34e and the ends of second recesses 32f and 34f are placed in flow communication. When placed in communication, the first recesses cooperate with one another to define a recess sized and shaped to extend substantially throughout the transverse extent of guide surfaces of machine way 10 and cooperate with such guide surfaces to define an upwardly opening reservoir 40 for collecting lubricating oil flowing downwardly along the guide surfaces, as best shown in FIGS. 1 and 4. Oil collecting in reservoir 40 may be drained therefrom by any suitable means, such as by providing leg portion 36 with a drain opening 42 sized to frictionally receive an end of tube 16.

Block sections 26 and 28 could be sized and shaped such that their inner surfaces are adapted to engage the guide surfaces of machine way 10 in a fluid sealed relationship sufficient to prevent seepage oil from reservoir 40 downwardly therebetween. However, manufacturing tolerances render this impractical, and thus it is preferable to prevent seepage of oil from reservoir 40 by providing block sections 26 and 28 with separate sealing means, which is in the form of an oil resistant, permanently flexible sealing material 44 received within second recesses 32f, 34f, 36f and 38f, and adapted to provide an effective fluid seal between the inner surfaces of the block sections and the machine way guide surfaces throughout their transverse extent. It is anticipated that diverse types of sealing materials would be adapted for use in the present invention. However, it has been found that an effective and inexpensive seal may be created by using an air curable silicone base caulking material or compound of the type available commercially in flexible tube containers and adapted for caulking cracks around bathroom tubs or the like. In any event, the sealant material would be applied to block sections 26 and 28 immediately prior to mounting thereof on machine way 10 with care being taken to insure that sufficient sealant is applied to completely fill the second recesses, as indicated at 44 in FIG. 4, and preferably to slightly overfill such second recesses such that when the block sections are clamped in place the sealant is forced to flow away from the second recesses and to create a thin film 44' essentially completely coating the contiguous portion of inner surfaces 32c, 34c, 36c, 38c and guide surfaces 24, 18, 20, 22, respectively. Commercially available caulking compound of the type referred to above possesses the additional advantage that it tends to expand slightly during its curing cycle and this tends to both insure complete filling of the second recesses and provide a slight force tending to positively maintain the sealant in fluid sealing surface engagement with the contiguous portions of the inner and guide surfaces.

While coupling means 30 may be variously defined, a preferred form thereof is shown in FIGS. 2 and 3 as comprising a machine screw device 46 adapted to be freely received within a stepped diameter, through bore opening 48, which extends transversely within a free end of leg portion 26 between its inner surface 32c and outer surface 32d, and threadedly received within a threaded opening 50, which opens through an end surface 34g of leg portion 34 disposed normal to surfaces 34a–34d. End surface 34g and the facing portion of inner surface 32c may be machined so as to provide for an intimate surface-to-surface engagement thereof sufficient to prevent escape of oil from reservoir 40 therebetween. Alternately, a fluid seal may be provided between surfaces 32c and 34g by extending second recesses 32f and 34f to define sealant receiving risers, not shown, comparable to risers 56 and 58 formed as extensions of second recesses 36f and 38f adjacent the free end portions of inner surfaces 36c and 38c, respectively.

In that surfaces 34g and 32c tend to slide or rotate relative to each other about the axis of screw device 46, as an incident to the latter being threaded into opening 50, it is preferable to incorporate as a part of coupling means 30 suitable means to constrain such movement. In the preferred form of the present invention, such constraint means is defined by a key in the form of a cylindrically shaped pin 60, which is releasably clamped within mating cylindrically shaped recesses 62 and 64 formed in surfaces 34g and 32c, respectively.

Again referring to FIG. 4, it will be understood that the height and width of reservoir 40, as measured from the upper and inner surfaces of block sections, respectively, is to some degree a matter of choice. However, it is preferable that the width of reservoir 40 be as small as practical in order to minimize direct entry thereinto of splashed coolant and machinery debris. Further, if desired, the upper surfaces of the leg portions may be downwardly and outwardly inclined, as indicated in broken line in FIG. 4 for the case of upper surfaces 34a' and 36a', in order to direct splashed coolant and debris away from reservoir 40.

Coolant, which may splash onto the machine ways 10 and 10' at a point above which block assemblies 14 and 14' are mounted, will of course flow downwardly for collection in reservoir 40 and thus lead to contamination of the lubricating oil. While contamination of the lubricating oil in this manner is undesirable, since it reduces the effective life of such oil, it does not represent a serious economic loss in view of the relatively low cost of purchasing/reprocessing/disposal of such oil. However, if desired, coolant contamination of the lubricating oil may be prevented by fitting a machine with a conventional shield or curtain arranged to prevent contact of splashed coolant with both the machine way and the present block assembly.

While only a preferred form of my lubricating oil salvaging block assembly has been described in detail, it is contemplated that alternate forms thereof may be devised without departing from the present invention. As by way of example, it is contemplated that more than two block sections may be employed in forming each assembly, particularly for situations wherein the configurations of the machine ways on which the assembly is to be mounted differ from the typical machine way construction illustrated in the drawings and/or machine clearance considerations are such as to make it difficult to mount L-shaped block sections on the machine ways. Additionally, it is contemplated that a reformed sealing device may be employed to prevent escape of oil from the reservoir downwardly between the guide surfaces and the inner surfaces of the block sections, such as may be defined by a resiliently deformable plastic or neoprene strip or gasket suitably attached to the block sections or applied to the guide surfaces prior to mounting of the assembly.

I claim:

1. An assembly adapted for mounting on a vertically disposed machine way for purposes of collecting lubricating oil passing downwardly along vertically elongated guide surfaces thereof, said assembly comprising in combination:
 a block having at least two sections of L-shaped plan view configurations defined by integrally formed first and second leg portions having inner surfaces cooperating to define a recess means sized and shaped to extend substantially throughout the transverse extent of said guide surfaces;
 coupling means for clamping free ends of said first leg portions together thereby to couple said sections one to another and contiguous to said guide surfaces with said recess means arranged for cooperation with said guide surfaces to define an upwardly opening lubricating oil collecting reservoir;
 means for providing a fluid seal between said sections and said guide surfaces substantially throughout the transverse extent thereof and relatively below said reservoir when said sections are contiguous to said guide surfaces; and
 means providing for flow of lubricating oil collected in said reservoir remotely of said block.

2. An assembly according to claim 1, wherein said sealing means includes second recess means defined by said inner surfaces and a sealant material received within said second recess means.

3. An assembly according to claim 1, wherein said coupling means includes a bore opening extending through said free end of one of said first leg portions between said inner surface and an outer surface thereof, a threaded opening extending lengthwise of the other of said first leg portions and opening through an end surface disposed normal to said inner surface thereof, and a screw device freely received within said bore opening and threadedly received within said threaded opening for clamping said end surface in surface-to-surface engagement with said inner surface of said one of said first leg portions.

4. An assembly according to claim 3, wherein said coupling means includes constraining means for constraining relative movement between said end surface and said inner surface of said one of said first leg portions normal to the axis of said screw device.

5. An assembly according to claim 4, wherein said constraining means includes a cylindrical pin and mating recesses in said end surface and said inner surface of said one of said first leg portions for clamping said pin therewithin.

6. An assembly according to claim 5, wherein said sealing means includes second recess means defined by said inner surfaces and a sealant material received within said second recess means.

* * * * *